US012635671B2

(12) United States Patent
Armbright

(10) Patent No.: US 12,635,671 B2
(45) Date of Patent: May 26, 2026

(54) COLLAR AND LEASH ASSEMBLY

(71) Applicant: Marguerite Armbright, Aberdeen, SD (US)

(72) Inventor: Marguerite Armbright, Aberdeen, SD (US)

( * ) Notice: Subject to any disclaimer, the term of this patent is extended or adjusted under 35 U.S.C. 154(b) by 96 days.

(21) Appl. No.: 18/915,777

(22) Filed: Oct. 15, 2024

(65) Prior Publication Data

US 2026/0101874 A1    Apr. 16, 2026

(51) Int. Cl.
*A01K 27/00*          (2006.01)

(52) U.S. Cl.
CPC .......... *A01K 27/003* (2013.01); *A01K 27/001* (2013.01)

(58) Field of Classification Search
CPC .. A01K 27/003; A01K 27/001; A01K 27/005; A01K 27/006
See application file for complete search history.

(56) References Cited

U.S. PATENT DOCUMENTS

| | | | | | |
|---|---|---|---|---|---|
| 3,884,190 | A | * | 5/1975 | Gurrey ................. | A01K 27/004 |
| | | | | | D30/153 |
| 4,584,967 | A | * | 4/1986 | Taplin .................. | A01K 27/001 |
| | | | | | 119/793 |
| 5,099,799 | A | * | 3/1992 | Giacobbe ............. | A01K 27/003 |
| | | | | | 119/793 |
| 5,497,733 | A | * | 3/1996 | Hull ..................... | A01K 27/001 |
| | | | | | 119/793 |
| 6,276,305 | B1 | * | 8/2001 | Pages ................... | A01K 27/006 |
| | | | | | 119/795 |
| 7,281,495 | B2 | * | 10/2007 | Wagner ................ | A01K 27/002 |
| | | | | | 119/793 |
| 2006/0042562 | A1 | * | 3/2006 | Wagner ................ | A01K 27/002 |
| | | | | | 119/792 |
| 2017/0049078 | A1 | * | 2/2017 | Farrar .................. | A01K 27/001 |
| 2019/0059333 | A1 | * | 2/2019 | Lagarde ............... | A01K 27/005 |
| 2020/0236908 | A1 | * | 7/2020 | Lagarde ............... | A01K 27/003 |

* cited by examiner

*Primary Examiner* — Trinh T Nguyen

(57)          ABSTRACT

A collar and leash assembly for wrapping a leash around a collar for storage of the leash on the collar includes a collar having an outer surface and an inner surface. A leash is attached and extends from the collar. The leash has a primary surface and a secondary surface. The leash is wrappable into a rolled configuration around the collar. A plurality of couplers are engageable with each other to releasably retain the leash in the rolled configuration. A plurality of collar couplers are positioned on the outer surface of the collar. A plurality of leash primary surface couplers are positioned on the primary surface of the leash and are removably engageable with the plurality of collar couplers. A plurality of leash secondary surface couplers are positioned on the secondary surface of the leash and are removably engageable with the plurality of leash primary surface couplers.

6 Claims, 7 Drawing Sheets

40

30

46

COLLAR AND LEASH ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to collars and more particularly pertains to a new collar for wrapping a leash around a collar for storage of the leash on the collar.

(2) Description of Related Art Including Information Disclosed Under 37 CFR 1.97 and 1.98

The prior art relates to collars. Collars are commonly used for pets, such as dogs and cats. For example, collars are often worn around the necks of pets. Various items, such as identification tags and leashes, can be attached to the collars. Specifically, leashes are often temporarily attached to collars when a user wants to take the pet for a walk, or for travel to another destination. However, collars and leashes are typically sold as completely separate products. Accordingly, the user must repeatedly attach and remove the leash from the collar. This process can be time consuming. When the pet has a lot of energy, or difficulty sitting still, the process can also be difficult and stressful for the user. Thus, there is a need for a collar that is fixedly attached to a leash. Ideally, such a device would have a "storage configuration" wherein the leash is retracted or otherwise wrapped around the collar, so that the leash does not merely drag from the collar behind the pet.

BRIEF SUMMARY OF THE INVENTION

An embodiment of the disclosure meets the needs presented above by generally comprising a collar having an outer surface and an inner surface. A leash is attached to the outer surface of the collar. The leash extends from the collar. The leash has a primary surface and a secondary surface.

The leash comprises a flexible material wherein the leash is wrappable into a rolled configuration around the collar. A plurality of couplers are engageable with each other to releasably retain the leash in the rolled configuration around the collar. The plurality of couplers include a plurality of collar couplers that are positioned on the outer surface of the collar. A plurality of leash primary surface couplers are positioned on the primary surface of the leash. The plurality of leash primary surface couplers are removably engageable with the plurality of collar couplers to releasably retain the primary surface of the leash against the outer surface of the collar. A plurality of leash secondary surface couplers are positioned on the secondary surface of the leash. The plurality of leash secondary surface couplers are removably engageable with the plurality of leash primary surface couplers to releasably retain the secondary surface of the leash against the primary surface of the leash.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
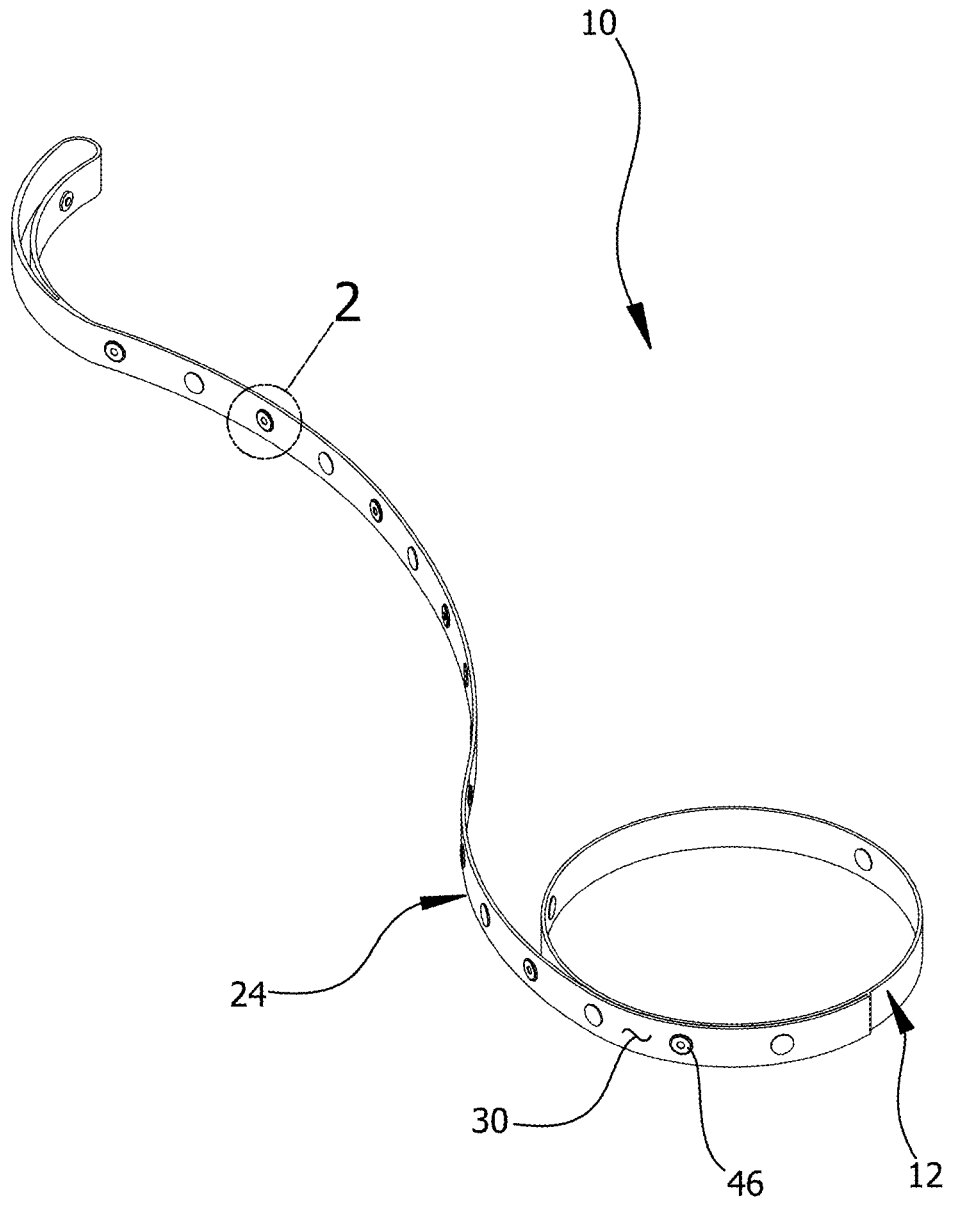
FIG. 1 is a front perspective view of a collar and leash assembly according to an embodiment of the disclosure.
Figure 2:
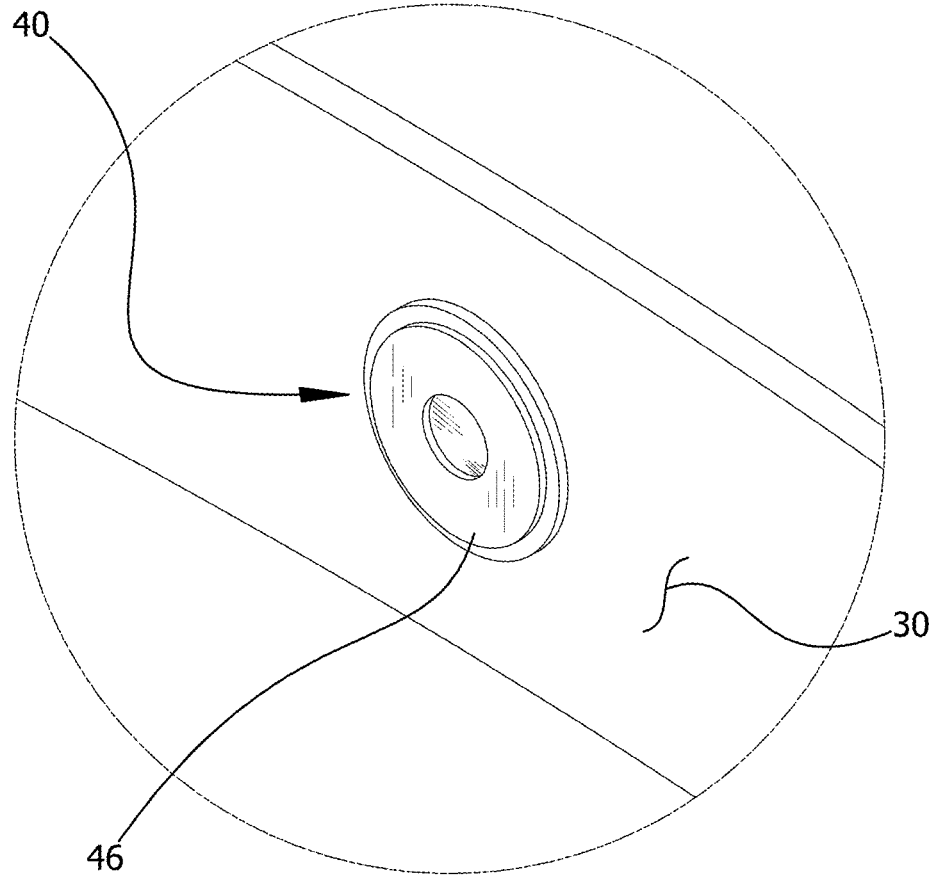
FIG. 2 is a detail view of an embodiment of the disclosure.
Figure 3:
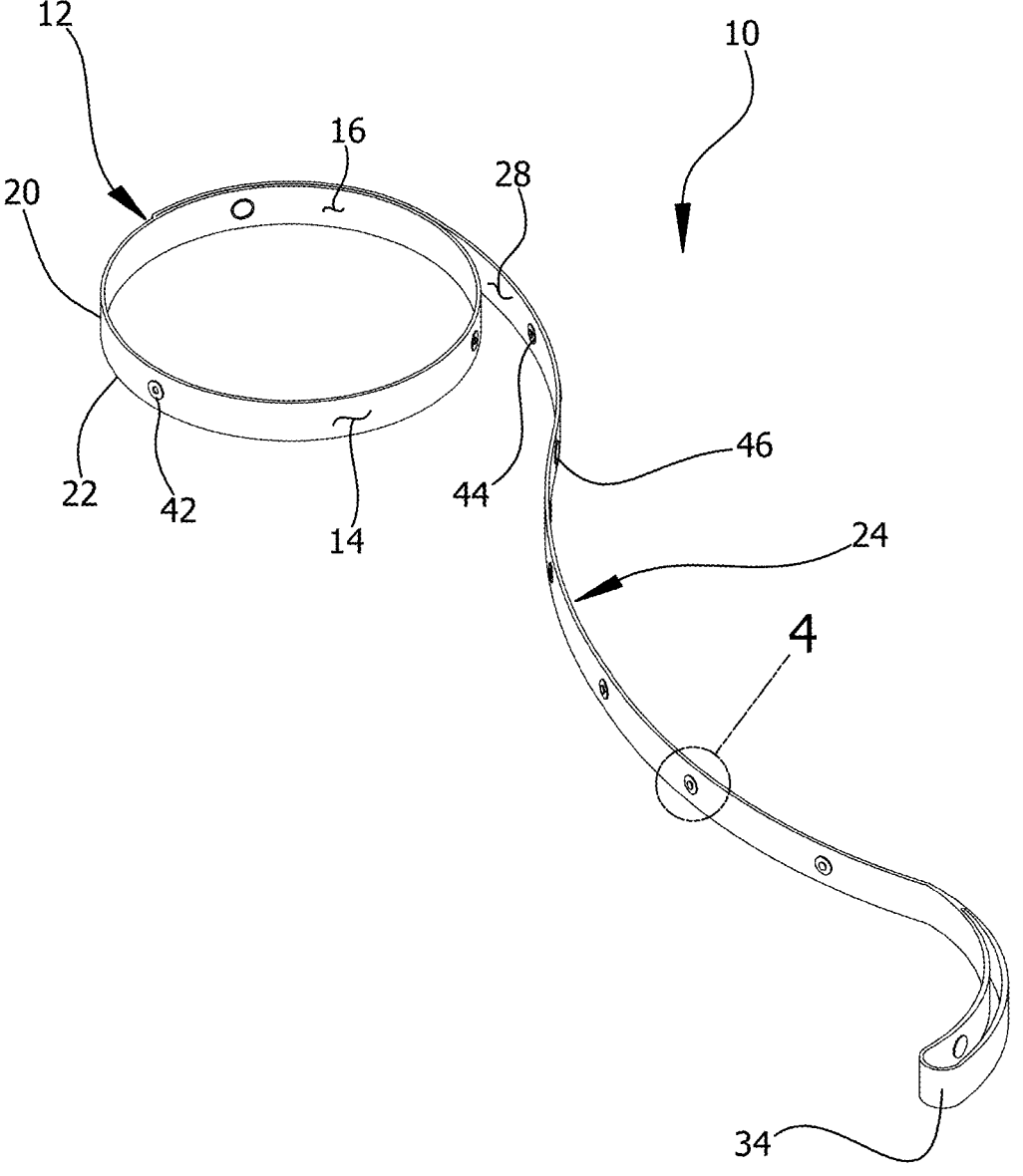
FIG. 3 is a rear perspective view of an embodiment of the disclosure.
Figure 4:
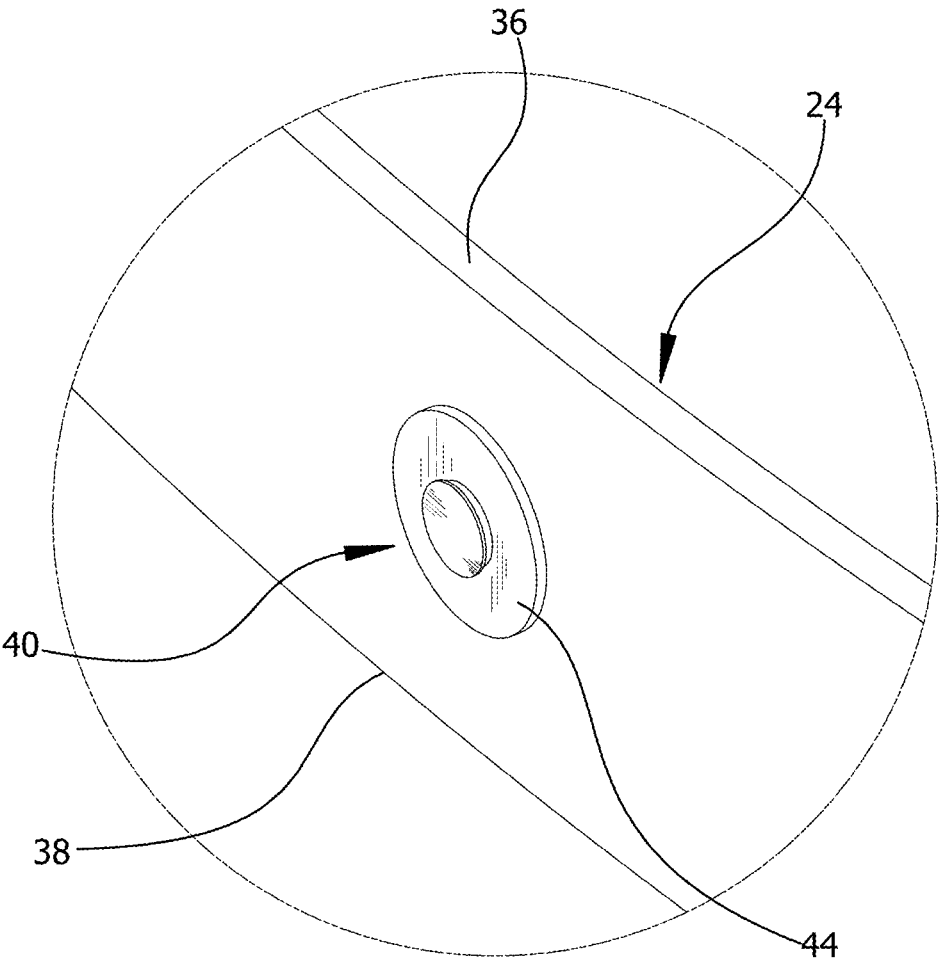
FIG. 4 is a detail view of an embodiment of the disclosure.

With reference now to the drawings, and in particular to FIGS. 1 through 7 thereof, a new collar embodying the principles and concepts of an embodiment of the disclosure and generally designated by the reference numeral 10 will be described.

Figure 7:
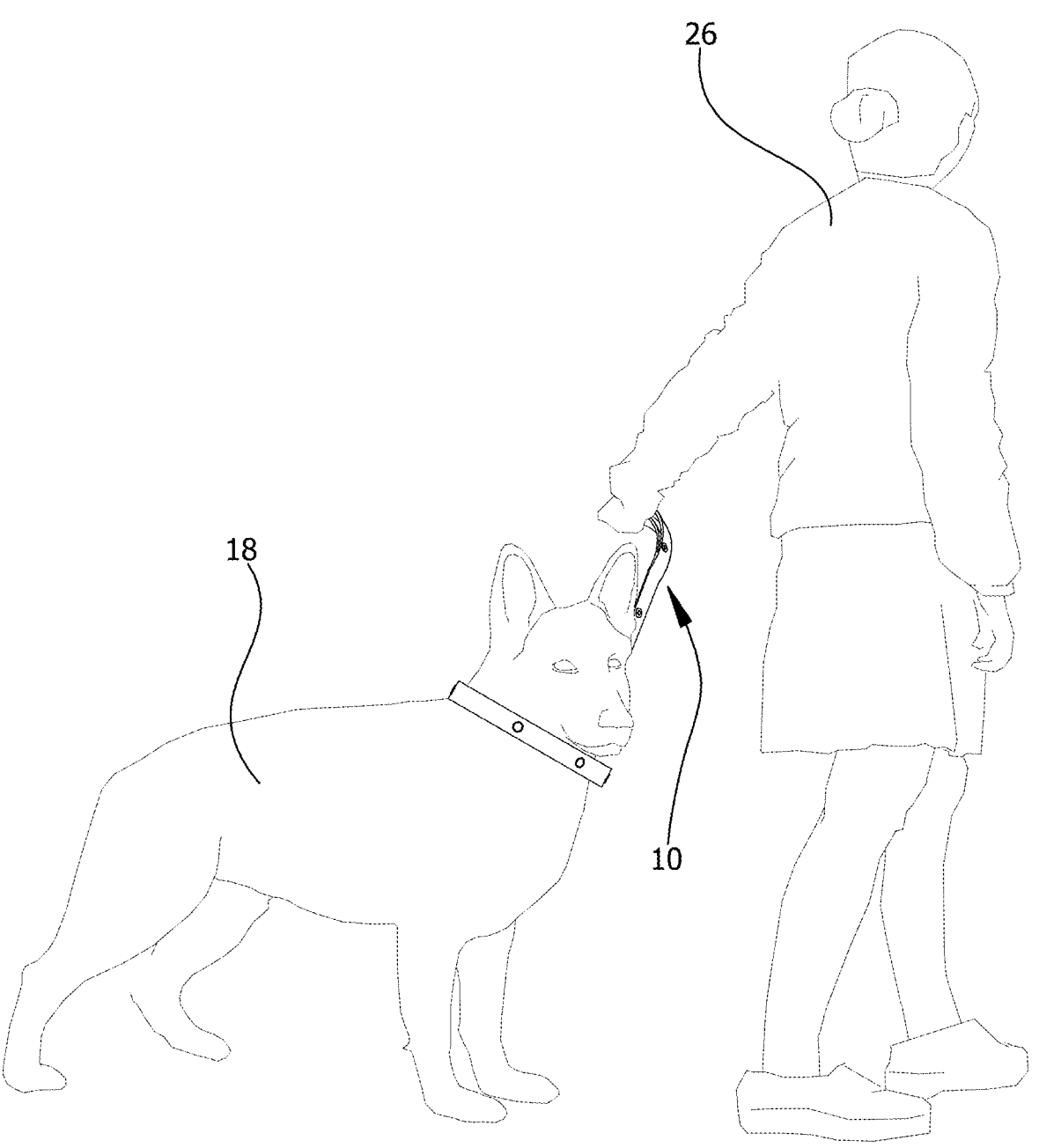
FIG. 7 is an in-use view of an embodiment of the disclosure.

As best illustrated in FIGS. 1 through 7, the collar and leash assembly 10 generally comprises a collar 12 having an outer surface 14 and an inner surface 16. The collar 12 is generally configured to fit around a neck of an animal 18. For example, the animal 18 may be a pet dog as shown in FIG. 7, although the collar 12 is also contemplated for use with other types and species of animals 18. The inner surface 16 may specifically be configured to be positionable adjacent to, or against, the neck of the animal 18. The collar 12 also generally includes a first lateral edge 20 and a second lateral edge 22.

A leash 24 is coupled the collar 12. For example, the leash 24 may extend from the outer surface 14 of the collar 12. The leash 24 is generally configured to facilitate a user 26 in controlling the animal 18. The leash 24 has a primary surface 28 and a secondary surface 30. The leash 24 comprises a flexible material wherein the leash 24 is configured to be wrappable into a rolled configuration 32 around the collar 12, for example while the collar 12 is positioned around the neck of the animal 18.

Figure 5:
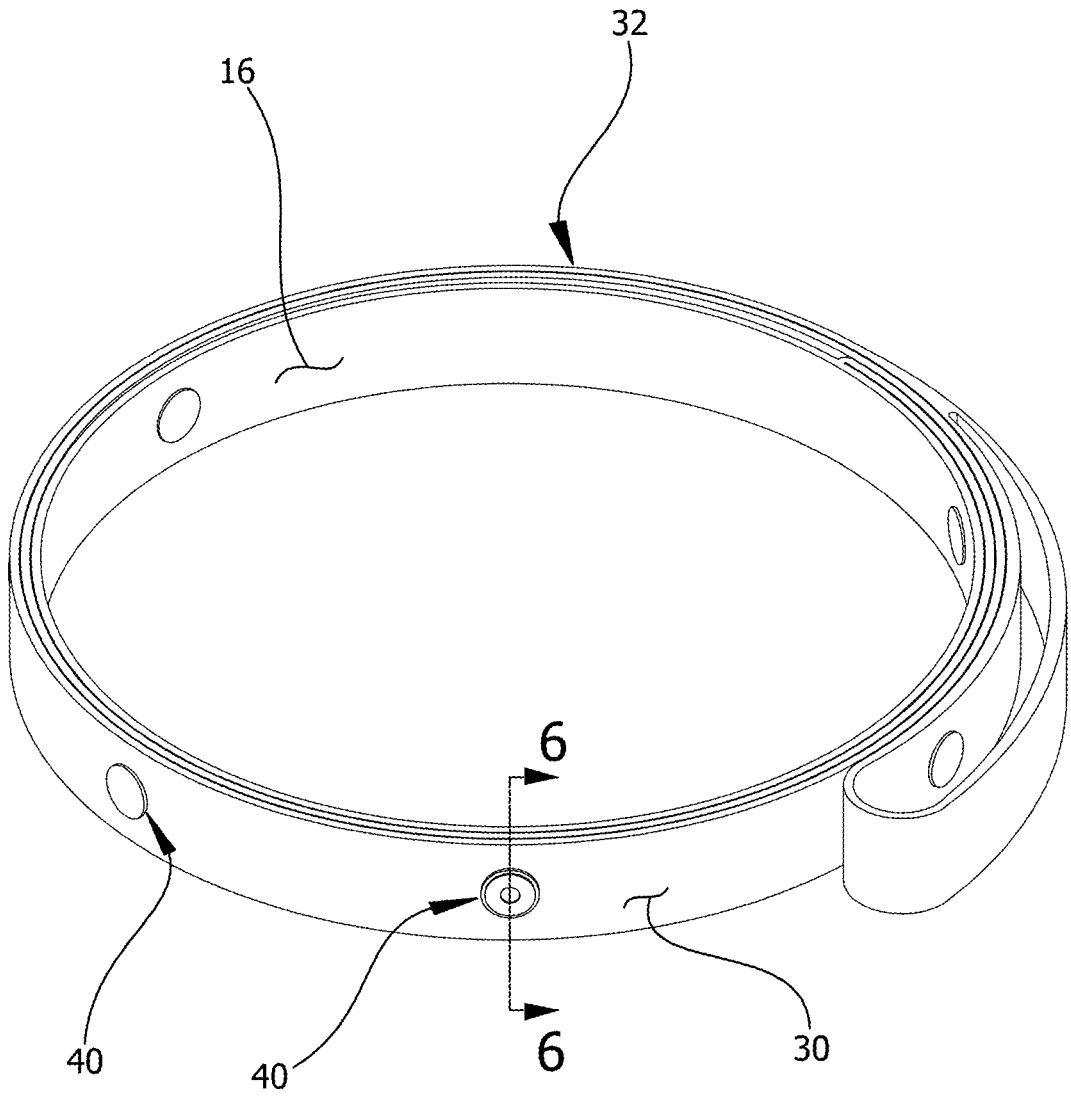
FIG. 5 is a perspective view of an embodiment of the disclosure.
Figure 6:
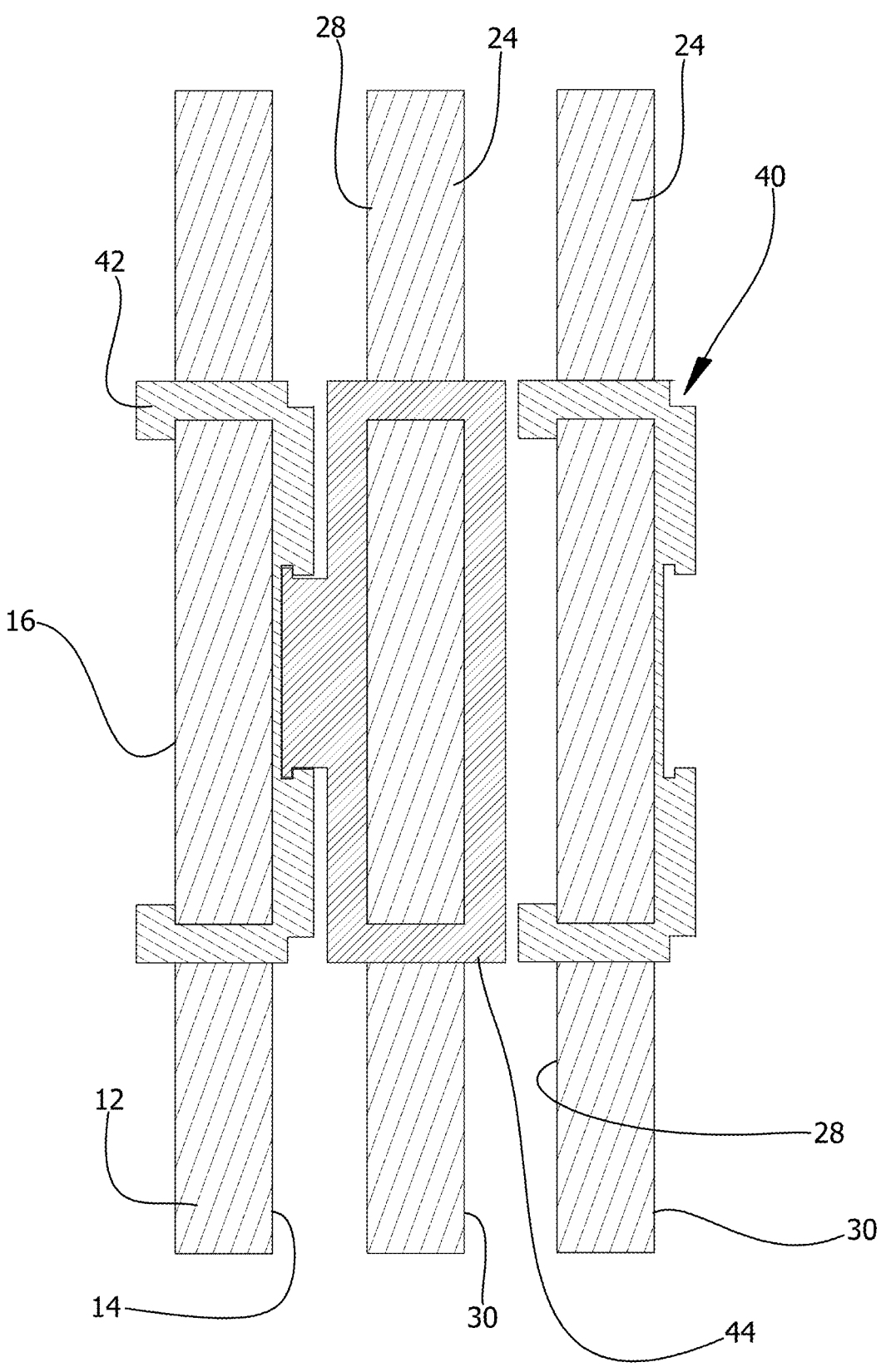
FIG. 6 is a cross-sectional view of an embodiment of the disclosure.

The leash 24 may include a handle 34 that is generally distally positioned relative to the collar 12. The handle 34 is configured to facilitate the user 26 in holding the leash 24, for example to control the animal 18. The handle 34 generally comprises the flexible material, wherein the handle 34 is wrappable against the leash 24 when the leash 24 is in the rolled configuration 32, as shown in FIG. 5.

The leash 24 generally has a length that is configured to extend between the animal 18 and the user 26. For example, the length may be between 3.0 feet and 6.0 feet, although other lengths are also contemplated. The length of the leash 24 may be measured between the collar 12 and the handle 34.

The leash 24 may further include a primary lateral edge 36. The primary lateral edge 36 may be alignable with the first lateral edge 20 of the collar 12. Specifically, the primary lateral edge 36 of the leash 24 may be coplanar with the first lateral edge 20 of the collar 12 while the leash 24 is in the rolled configuration 32.

The leash 24 may also have a secondary lateral edge 38. The secondary lateral edge 38 may be alignable with the second lateral edge 22 of the collar 12. Specifically, the secondary lateral edge 38 of the leash 24 may be coplanar with the second lateral edge 22 of the collar 12 while the leash 24 is in the rolled configuration 32.

A plurality of couplers 40 are engageable with each other to releasably retain the leash 24 in the rolled configuration 32 around the collar 12.

For example, the plurality of couplers 40 may include a plurality of collar couplers 42 that are generally positioned on the outer surface 14 of the collar 12. The plurality of collar couplers 42 may be equidistantly spaced between the first lateral edge 20 and the second lateral edge 22 of the collar 12. Each collar coupler of the plurality of collar couplers 42 is generally spaced from an adjacent collar coupler of the plurality of collar couplers 42.

A plurality of leash primary surface couplers 44 may be positioned on the primary surface 28 of the leash 24. The plurality of leash primary surface couplers 44 are removably engageable with the plurality of collar couplers 42 to releasably retain the primary surface 28 of the leash 24 against the outer surface 14 of the collar 12. The plurality of leash primary surface couplers 44 may be equidistantly spaced between the primary lateral edge 36 and the secondary lateral edge 38 of the leash 24. Each leash primary surface coupler of the plurality of leash primary surface couplers 44 may be spaced from an adjacent leash primary surface coupler of the plurality of leash primary surface couplers 44 by a distance that is complementary to a distance between adjacent pairs of the plurality of collar couplers 42 wherein the plurality of leash primary surface couplers 44 are alignable with the plurality of collar couplers 42 when the leash 24 is in the rolled configuration 32.

A plurality of leash secondary surface couplers 46 may be positioned on the secondary surface 30 of the leash 24. The plurality of leash secondary surface couplers 46 are removably engageable with the plurality of leash primary surface couplers 44 to releasably retain the secondary surface 30 of the leash 24 against the primary surface 28 of the leash 24. Each leash secondary surface coupler of the plurality of leash secondary surface couplers 46 may be equidistantly spaced between the primary lateral edge 36 and the secondary lateral edge 38 of the leash 24. Each leash secondary surface coupler of the plurality of leash secondary surface couplers 46 may be positioned between adjacent pairs of the plurality of leash primary surface couplers 44. Each leash secondary surface coupler of the plurality of leash secondary surface couplers 46 may be spaced from an adjacent leash secondary surface coupler of the plurality of leash secondary surface couplers 46 by a distance is complementary to a distance between adjacent pairs of the plurality of leash primary surface couplers 44 wherein the plurality of leash secondary surface couplers 46 are alignable with the plurality of leash primary surface couplers 44 when the leash 24 is in the rolled configuration 32.

In use, the collar 12 can be positioned around the neck of the animal 18. The leash 24 may be stored in the rolled configuration 32 around the collar 12, while the collar 12 is worn by the animal 18. When the user 26 wants to use the leash 24, for example to take the animal 18 for a walk, the user 26 can simply release the plurality of couplers 40 from each other. When the animal 18 is not is walked, or the leash 24 is otherwise not required, the leash 24 can be wrapped into the rolled configuration 32 for storage around the collar 12. Neither the collar 12 nor the leash 24 needs to be removed from the animal 18.

As shown in the drawings, the plurality of couplers 40 may each comprise a snap fastener. Alternative couplers, such as magnets, hook and loop fasteners, and buttons, are also contemplated but are not preferred because they are either more difficult to engage and release, or because they are more likely to become worn after repeated uses. For example, magnets may easily become decoupled from one another while the animal 18 is running or playing, and buttons may be more time consuming to engage and release.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A leash assembly comprising:
a collar having an outer surface and an inner surface;

a leash being coupled the collar, the leash extending from the collar, the leash having a primary surface and a secondary surface, the leash comprising a flexible material wherein the leash is wrappable into a rolled configuration around the collar;

a plurality of couplers being engageable with each other to releasably retain the leash in the rolled configuration around the collar, each coupler of the plurality of couplers being a snap fastener, the plurality of couplers including:

a plurality of collar couplers being positioned on the outer surface of the collar;

a plurality of leash primary surface couplers being positioned on the primary surface of the leash, the plurality of leash primary surface couplers being removably engageable with the plurality of collar couplers to releasably retain the primary surface of the leash against the outer surface of the collar, the plurality of leash primary surface couplers being spaced from each other;

a plurality of leash secondary surface couplers being positioned on the secondary surface of the leash, the plurality of leash secondary surface couplers being removably engageable with the plurality of leash primary surface couplers to releasably retain the secondary surface of the leash against the primary surface of the leash, each leash secondary surface coupler of the plurality of leash secondary surface couplers being positioned between adjacent pairs of the plurality of leash primary surface couplers wherein the plurality of leash secondary surface couplers and the plurality of leash secondary surface couplers alternate along a length of the leash to facilitate alignment of the plurality of leash secondary surface couplers with the plurality of leash primary surface couplers.

2. The leash assembly of claim 1, wherein each coupler of the plurality of couplers comprises a snap fastener.

3. The leash assembly of claim 1, wherein the plurality of collar couplers are equidistantly spaced between a first lateral edge and a second lateral edge of the collar.

4. The leash assembly of claim 3, the leash further comprising:

a primary lateral edge being alignable with the first lateral edge of the collar wherein the primary lateral edge of the leash is coplanar with the first lateral edge of the collar while the leash is in the rolled configuration; and a secondary lateral edge being alignable with the second lateral edge of the collar wherein the secondary lateral edge of the leash is coplanar with the second lateral edge of the collar while the leash is in the rolled configuration.

5. The leash assembly of claim 1, the leash further comprising a handle being distally positioned relative to the collar.

6. A leash assembly comprising:

a collar having an outer surface and an inner surface, the collar being configured to fit around a neck of an animal wherein the inner surface is configured to be positionable adjacent to the neck of the animal, the collar having a first lateral edge and a second lateral edge;

a leash being attached to the outer surface of the collar, the leash extending from the collar wherein the leash is configured to facilitate a user in controlling the animal, the leash having a primary surface and a secondary surface, the leash comprising a flexible material wherein the leash is configured to be wrappable into a rolled configuration around the collar while the collar is positioned around the neck of the animal, the leash including:

a handle being distally positioned relative to the collar wherein the handle is configured to facilitate the user in holding the leash to control the animal;

a primary lateral edge being alignable with the first lateral edge of the collar wherein the primary lateral edge of the leash is coplanar with the first lateral edge of the collar while the leash is in the rolled configuration; and a secondary lateral edge being alignable with the second lateral edge of the collar wherein the secondary lateral edge of the leash is coplanar with the second lateral edge of the collar while the leash is in the rolled configuration;

a plurality of couplers being engageable with each other to releasably retain the leash in the rolled configuration around the collar, the plurality of couplers including:

a plurality of collar couplers being positioned on the outer surface of the collar, the plurality of collar couplers being equidistantly spaced between the first lateral edge and the second lateral edge of the collar;

a plurality of leash primary surface couplers being positioned on the primary surface of the leash, the plurality of leash primary surface couplers being removably engageable with the plurality of collar couplers to releasably retain the primary surface of the leash against the outer surface of the collar, the plurality of leash primary surface couplers being equidistantly spaced between the primary lateral edge and the secondary lateral edge of the leash;

a plurality of leash secondary surface couplers being positioned on the secondary surface of the leash, the plurality of leash secondary surface couplers being removably engageable with the plurality of leash primary surface couplers to releasably retain the secondary surface of the leash against the primary surface of the leash, each leash secondary surface coupler of the plurality of leash secondary surface couplers being equidistantly spaced between the primary lateral edge and the secondary lateral edge of the leash, each leash secondary surface coupler of the plurality of leash secondary surface couplers being positioned between adjacent pairs of the plurality of leash primary surface couplers wherein the plurality of leash secondary surface couplers and the plurality of leash secondary surface couplers alternate along a length of the leash to facilitate alignment of the plurality of leash secondary surface couplers with the plurality of leash primary surface couplers; and wherein each coupler of the plurality of couplers comprises a snap fastener.

* * * * *